April 30, 1940.   E. S. MacPHERSON   2,198,780

PITMAN ARM

Filed Oct. 3, 1938

Inventor
Earle S. MacPherson

By Blackmore, Spencer & Flint
Attorneys

Patented Apr. 30, 1940

2,198,780

UNITED STATES PATENT OFFICE 2,198,780

PITMAN ARM

Earle S. MacPherson, Detroit, Mich., assignor to General Motors Corporation, Detroit, Mich., a corporation of Delaware Application October 3, 1938, Serial No. 233,016

2 Claims. (Cl. 74—559)

This invention relates to steering mechanism for motor vehicles and more particularly to an improved pitman arm structure.

An object of the invention is to provide a simple and foolproof structure which may be manufactured and serviced at low cost and which in use will serve as a cushion against road shock in protective relation to the steering gear mechanism.

A further object is to provide a two part pitman arm with sections joined together through a cushion coupling which will eliminate metal to metal contact without introducing looseness and play in the cushion transmitting linkage, such as would allow the vehicle to wander on the road, but which has sufficient stiffness that the steerable wheels are at all times directly responsive to manual effort on the steering wheel and remain in given relation to steering wheel settings.

Figure 1:
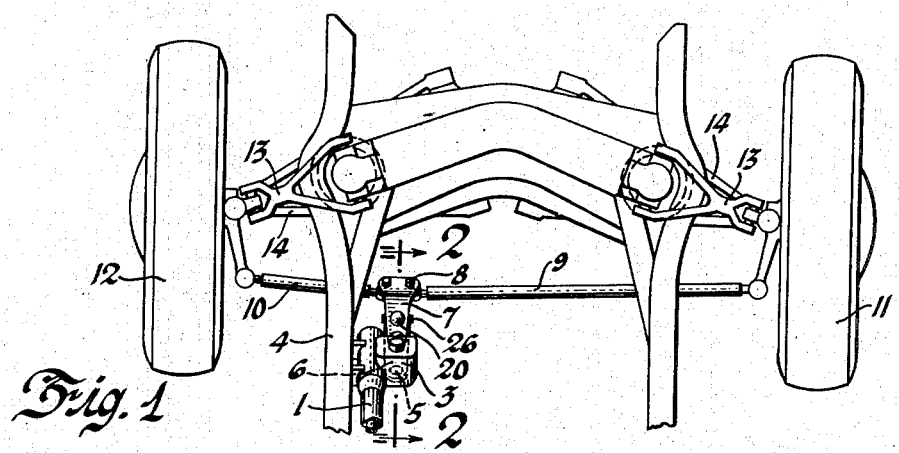
Figure 2:
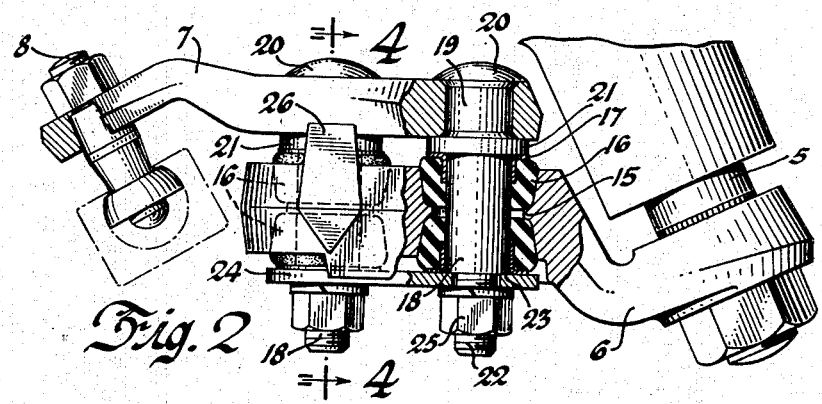
Figure 3:
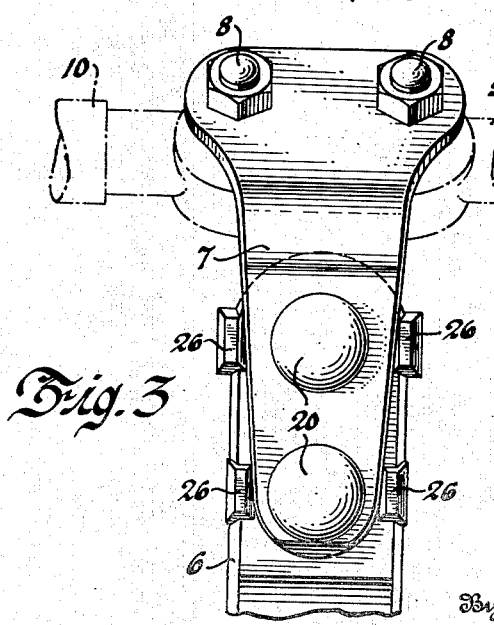
Figure 4:
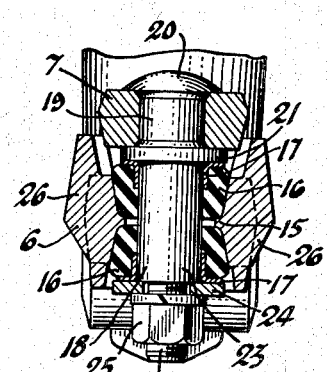

Additional objects and advantages will become apparent during the course of the following specification having reference to the accompanying drawing wherein Figure 1 is a plan view of a portion of an automobile showing the steering mechanism; Figure 2 is an enlarged detail view of the pitman arm structure with parts in section as on line 2—2 of Figure 1; Figure 3 shows the structure of Figure 2 as viewed from the top, and Figure 4 is a detail section taken on line 4—4 of Figure 2.

In the drawing the reference character 1 indicates a steering column assembly having the usual hand wheel at the upper end and the gear case 3 at the lower end mounted on the chassis frame 4. Projecting downwardly from the gear case is the rockshaft 5 on which is mounted the swinging pitman arm, which in the present instance may consist of a pair of forgings 6 and 7 arranged side by side in overlapping relation and fastened one to the other as a unit assembly. At the free or swinging end of the section 7 are fastened a pair of ball studs 8—8 for joining to the pitman arm in end to end alignment a pair of tie rods 9 and 10 extending transversely of the vehicle for connection at their outer ends with the steering arms of the road wheels 11 and 12, respectively. Any suitable suspension arrangement may be employed for mounting the chassis frame on the road wheels, that illustrated in the drawing being of a well known independent wheel suspension structure. It involves upper and lower arms 13 and 14, respectively, pivoted at their inner ends to the chassis frame and at their outer ends to the steering wheel knuckle with a coil spring interposed between the lower arm 14 and the chassis frame 1.

Referring more particularly to Figure 2 it will be seen that the arm section 6 which is splined to the rockshaft 5 is provided with a pair of bearings or openings therethrough spaced radially of each other with respect to the axis of the rockshaft 5. These openings extend through the arm in a direction at right angles to the path of swinging arm movement and each may comprise oppositely tapered side walls extending outwardly from the central internal rib 15. Received thereby are a pair of frusto-conical or tapered plugs 16 of rubber or other elastic deformable material inserted from opposite sides of the opening and fitted to the internal rib 15. Flanged metal rings 17 are carried within the central openings through the plugs. Mounted in the rubber plugs positioned in each opening is a stud 18 carried by and forming a lateral projection of the arm section 7, two of such studs being provided, one for each of the openings in the arm section 6.

For convenience these studs are formed separately from the arm and are later secured thereto by projecting, through openings in the arm, the end portion 19 of each stud and riveting over the head as at 20. Bearing on the face of the arm 7 opposite to that engaged by the riveted head 20 is an annular spacer flange 21 integral with the stud and which also engages the end of the adjacent plug 16. At its opposite end the stud has a reduced threaded portion 22 forming a shoulder 23 against which bears a clamping plate 24 fastened on the stud 22 by the nut 25.

The shoulder 23 provides a definite limit for tightening the nut 25 so that by proper selection of parts and predetermination of manufacturing tolerances the workman is relieved of the necessity of exercising care in assembling the parts. In the assembly the plate 24 and the annular flange 21 exert an endwise pressure on the rubber plugs 16 causing the internal deformation thereof to conform to the shape of the space in which they are received and the load on the rubber affords a tight connection. The pressure plate 24 engages both studs and the spaced relation of the studs to each other and to the axis of the rockshaft 5 affords a stiff assembly tending to resist relative movement between the arm sections and at the same time eliminate metal to metal contact. Because of the insulation of the parts from each other through the rubber collars or spacers the transmission of shocks is reduced and road noises and vibrations are cushioned by the reaction in the rubber.

As a further precaution against relative movement and to insure definite alignment of the arm sections the section 6 is formed along each side with a pair of spaced lugs 26—26, as seen particularly in Figure 3, and these projecting arms in cooperation with each other and the arm 6 provide a channel shaped pocket for the reception of the overlapping portion of the arm 7 thereby providing a positive limit to resist relative displacement of the sections comprising the pitman arm assembly.

I claim:

1. A steering pitman comprising a pair of sections having adjacent end portions in overlapping relation, laterally spaced upstanding projections on one of the sections forming a channel shaped pocket to receive the overlapping portion of the other section, one section having a pair of radially spaced openings extending therethrough in a direction transverse to the plane of swinging movement of the pitman, elastic bushings within said openings, anchor studs projecting from the other section through said bushings and having shouldered ends, a connecting plate fitted to said ends for the application of endwise pressure on the bushings and seated on the shoulders and means retaining the plate on said studs.

2. In a two part steering pitman arm, a pair of pins fixed to one part and projected laterally therefrom through spaced openings in the other part, said pins being formed at their free ends beyond said openings with shouldered abutment seats, insulating spacers of elastic deformable material sleeved on the pins and fitted to and contained within said openings for the transmission therethrough of motion between the pitman arm parts, a clamp plate tying the free ends of said pins together and exerting predetermined endwise pressure on the spacers, and means holding the plate against said shouldered abutments.

EARLE S. MacPHERSON.